United States Patent
Wong et al.

[19]

[11] Patent Number: 6,134,085
[45] Date of Patent: Oct. 17, 2000

[54] HEAD SUSPENSION ASSEMBLY ATTACHMENT USING SHAPE MEMORY ALLOY

[75] Inventors: Walter Wong; Albert M. Lindrose; William J. Bryan, all of Boulder, Colo.

[73] Assignee: Seagate Technology, Inc., Scotts Valley, Calif.

[21] Appl. No.: 09/126,231

[22] Filed: Jul. 30, 1998

Related U.S. Application Data

[60] Provisional application No. 60/054,314, Jul. 31, 1997.

[51] Int. Cl.$^7$ ...................................................... G11B 5/48
[52] U.S. Cl. ............................................................. 360/244.5
[58] Field of Search ................................. 360/106, 104, 360/244.5, 244.6, 245.2

[56] References Cited

U.S. PATENT DOCUMENTS 5,062,018  10/1991  Yeager ..................................... 360/104
5,187,625  2/1993  Blaeser et al. .......................... 360/104
5,225,949  7/1993  King et al. .............................. 360/104
5,706,574  1/1998  Shimanuki et al. ..................... 360/104

*Primary Examiner*—Craig A. Renner
*Attorney, Agent, or Firm*—Crowe & Dunlevy

[57] ABSTRACT

A mounting system for attaching head suspension assemblies to actuator mounting arms of a disc drive actuator. The mounting system of the invention comprises mounting plates for the head suspension assemblies that include bosses inserted in cooperative holes in the actuator head mounting arms. Mounting discs of shape memory allow, in martensitic phase, having outer diameters selected for cooperation with the inner diameter of the bosses, are press-fitted into the bosses. The mounting discs are then heated to transform the material of the mounting discs to the austenitic phase. This transformation causes the outer diameter of the mounting discs to increase with sufficient force to deform the bosses of the mounting plates into interference fit with the holes in the actuator head mounting arms.

8 Claims, 4 Drawing Sheets

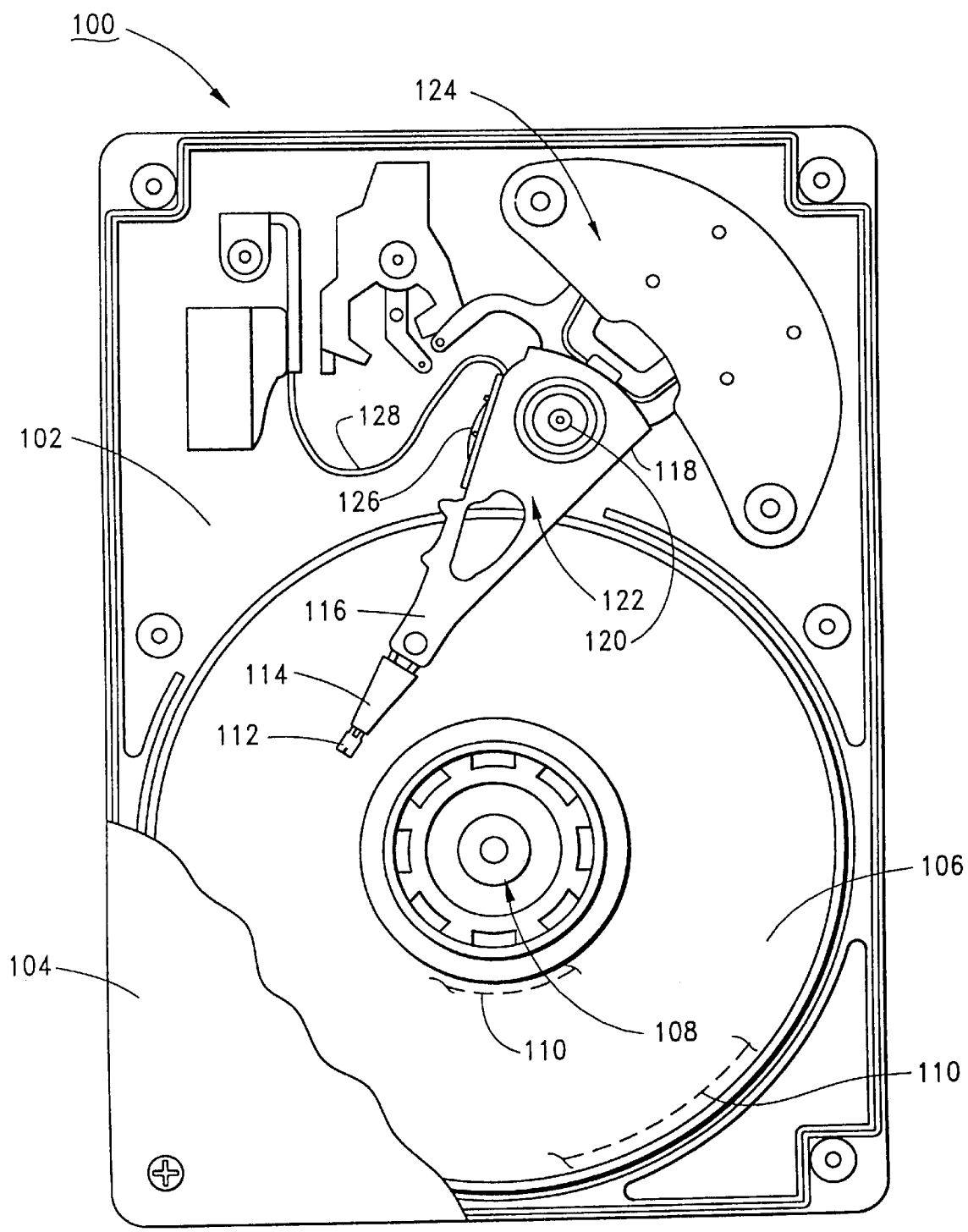
PRIOR ART

HEAD SUSPENSION ASSEMBLY ATTACHMENT USING SHAPE MEMORY ALLOY

RELATED APPLICATIONS

This application claims priority to Provisional Application Ser. No. 60/054,314 entitled METHOD OF ATTACHING HEAD GIMBAL ASSEMBLIES TO ACTUATOR HEAD, filed Jul. 31, 1997.

FIELD OF THE INVENTION

This invention relates generally to the field of hard disc drive data storage devices, and more particularly, but not by way of limitation, to an improved mounting system for attaching the head suspensions that support the read/write heads to the head mounting arms of the disc drive actuator.

BACKGROUND OF THE INVENTION

Disc drives of the type known as "Winchester" disc drives or hard disc drives are well known in the industry. Such disc drives record digital data on a plurality of circular, concentric data tracks on the surfaces of one or more rigid discs. The discs are typically mounted for rotation on the hub of a spindle motor. In disc drives of the current generation, the spindle motor rotates the discs at speeds of 10,000 RPM or more.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator housing opposite to the coil, the actuator housing also typically includes a plurality of vertically aligned, radially extending actuator head mounting arms, to which the head suspensions mentioned above are mounted. When controlled current is applied to the coil, a magnetic field is formed surrounding the coil which interacts with the magnetic field of the permanent magnets to rotate the actuator housing, with the attached head suspensions and head assemblies, in accordance with the well-known Lorentz relationship. As the actuator housing rotates, the heads are moved radially across the data tracks along an arcuate path.

The head suspensions mentioned above are typically formed from thin stainless steel foil. In order to provide a robust connection between the head suspension and the actuator head mounting arms, the attachment end of the head suspension is typically welded to a relatively thick mounting plate which includes features intended to cooperate with mating features on the actuator head mounting arms to attach the head suspensions to the actuator.

By far the most common head suspension mounting method in current use is swage mounting. Swage mounted head suspensions include mounting plates that are formed with a cylindrical swage boss. Typically, the entire array of head/suspension assemblies is placed in cooperative arrangement with the actuator head mounting arms, with the swage bosses of the head suspension mounting plates inserted into openings in the actuator head mounting arms. A swaging tool, consisting of a ball or tapered cone feature having a diameter slightly larger than the inner diameter of the swage bosses, is then passed through the entire vertically aligned stack of swage bosses, expanding the swage bosses into firm contact with the inner diameters of the openings in the actuator head mounting arms. Thus, swage mounting of the head/suspension assemblies is simple and economical for use in high volume manufacturing environments.

Swage mounting of head suspensions does, however, produce potential problems. Firstly, the plastic deformation of the swage bosses during the swaging process induces large mechanical stresses in the material of the mounting plates, and these mechanical stresses can lead to deformation of the planar portion of the mounting plates to which the thin head suspensions are welded. Such deformation can lead to uncontrolled variation in the pitch and roll static attitudes of the entire head suspension/head assembly, adversely affecting the data recording/recovery performance of the entire disc drive.

Secondly, since the swage mounting plates must be located on the upper and lower surfaces of the actuator head mounting arms, and since certain minimal vertical dimensions of the various components must be maintained to provide the necessary mounting strength, swage mounting dictates that the vertical spacing between the elements of the head/disc stack has a finite minimum. In order to provide the maximum amount of storage capacity in a disc drive, designers seek to incorporate the greatest number of heads and discs possible within industry-defined physical form factors, or, alternatively, to develop ever smaller form factors. Thus, swage mounting imposes limits on the number of heads and disc that can be fitted into a defined physical package, and may impose limits on the total storage capacity of the disc drive.

Finally, swage mounting, by definition, mechanically deforms the associated components when it is performed. If, after assembly, a faulty component is discovered, it is difficult to disassemble a swage mounted head suspension assembly without damaging other "good" components. Additionally, reinsertion of a replacement swage mounted head suspension into a head mounting arm that has already been stressed by a previous swaging operation may result in less than optimal mounting force, leading to undesirable variation in the finished product.

For these and other reasons to be noted below, a need clearly exists for an alternative to current methods of swage mounting the head suspension assemblies in a disc drive.

SUMMARY OF THE INVENTION

The present invention is an improved mounting system for attaching head suspension assemblies to actuator mounting arms of a disc drive actuator. The mounting system of the invention comprises mounting plates supporting the head suspension assemblies, the mounting plates including bosses that are inserted in cooperative bores in the actuator head mounting arms. Mounting discs of shape memory alloy, in martensitic phase, having outer diameters selected for cooperation with the inner diameter of the bosses, are then lightly press-fitted into the bosses. The mounting discs are then heated to transform the material of the mounting discs to its austenitic phase. This transformation causes the outer diameter of the mounting discs to increase with sufficient force to deform the bosses of the mounting plates, providing an interference fit within the bore in the actuator head mounting arms. Various materials for the mounting discs, as well as alternative geometries for the shape memory alloy elements, are discussed.

It is an object of the invention to provide a mounting system for attaching a head suspension assembly to an actuator head mounting arm in a disc drive.

It is another object of the invention to provide a mounting system for attaching a plurality of head suspension assemblies to a plurality of actuator head mounting arms in a disc drive.

It is another object of the invention to provide a mounting system for attaching a plurality of head suspension assemblies to a plurality of actuator head mounting arms in a disc drive which provides highly consistent mounting force to all of the head suspension assemblies in the disc drive.

It is another object of the invention to provide a mounting system for attaching a plurality of head suspension assemblies to a plurality of actuator head mounting arms in a disc drive which is simple and economical to implement in a high-volume manufacturing environment.

The manner in which the present invention achieves these objects, as well as other features, benefits and advantages of the invention, can best be understood by a review of the following Detailed Description of the Invention, when read in conjunction with an examination of the accompanying drawings.

BRIEF DESCRIPTION OF THE DRAWINGS

FIG. 1 is a plan view of a prior art disc drive in which the present invention is particularly useful.

DETAILED DESCRIPTION

Figure 2:
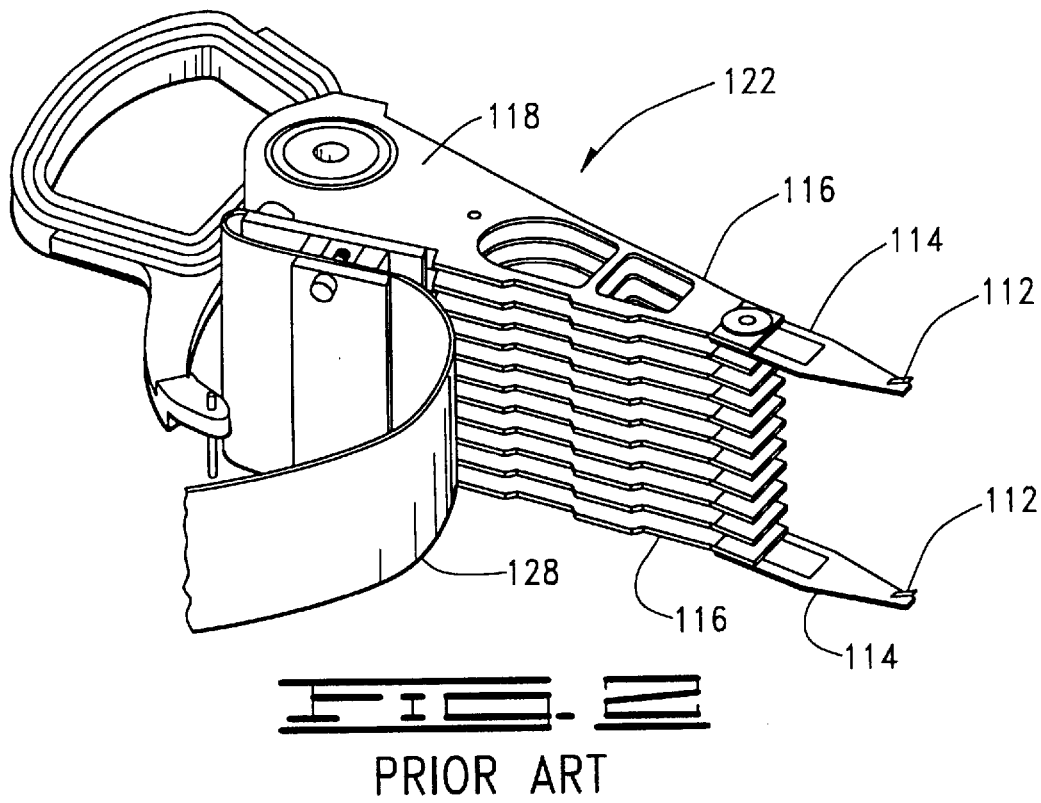
FIG. 2 is a perspective view of the actuator assembly portion of the disc drive of FIG. 1.

Referring to the drawings and specifically to FIG. 1, shown is a typical disc drive 100 in which the present invention is particularly useful. The disc drive 100 includes a base deck 102 to which all other components are directly or indirectly mounted and a top cover 104 (shown in partial cutaway) which, together with the base deck 102, forms a disc drive housing enclosing delicate internal components and isolating these components from external contaminants.

The disc drive 100 includes a plurality of discs 106 which are mounted for rotation on a spindle motor shown generally at 108. The discs 106 include surfaces having a plurality of circular, concentric data tracks, the innermost and outermost of which are shown by dashed lines at 110, on which data are recorded via an array of vertically aligned head assemblies (one shown at 112). The head assemblies 112 are supported by head suspensions 114 which are attached to mounting arms 116. The mounting arms 116 may be integral to an actuator body 118 which is mounted for rotation about a pivot shaft 120.

Together the actuator body 118 and the head assembly 112, and the interconnecting support structure, form a portion of an actuator assembly 122. FIG. 2 shows the actuator assembly 122 having two head suspensions 114 attached to the mounting arms 116, the other head suspensions 114 not shown for clarity.

Returning to FIG. 1, power to drive the actuator body 118 in rotation about the pivot shaft 120 is provided by a voice coil motor (VCM) shown generally at 124. Electronic circuitry (partially shown at 126) to control all aspects of the operation of the disc drive 100 is provided, with control signals to drive the VCM 124 as well as data signals to and from the heads 112, carried between the electronic circuitry and the moving actuator assembly 122 via a flexible printed circuit cable 128.

Figure 3:
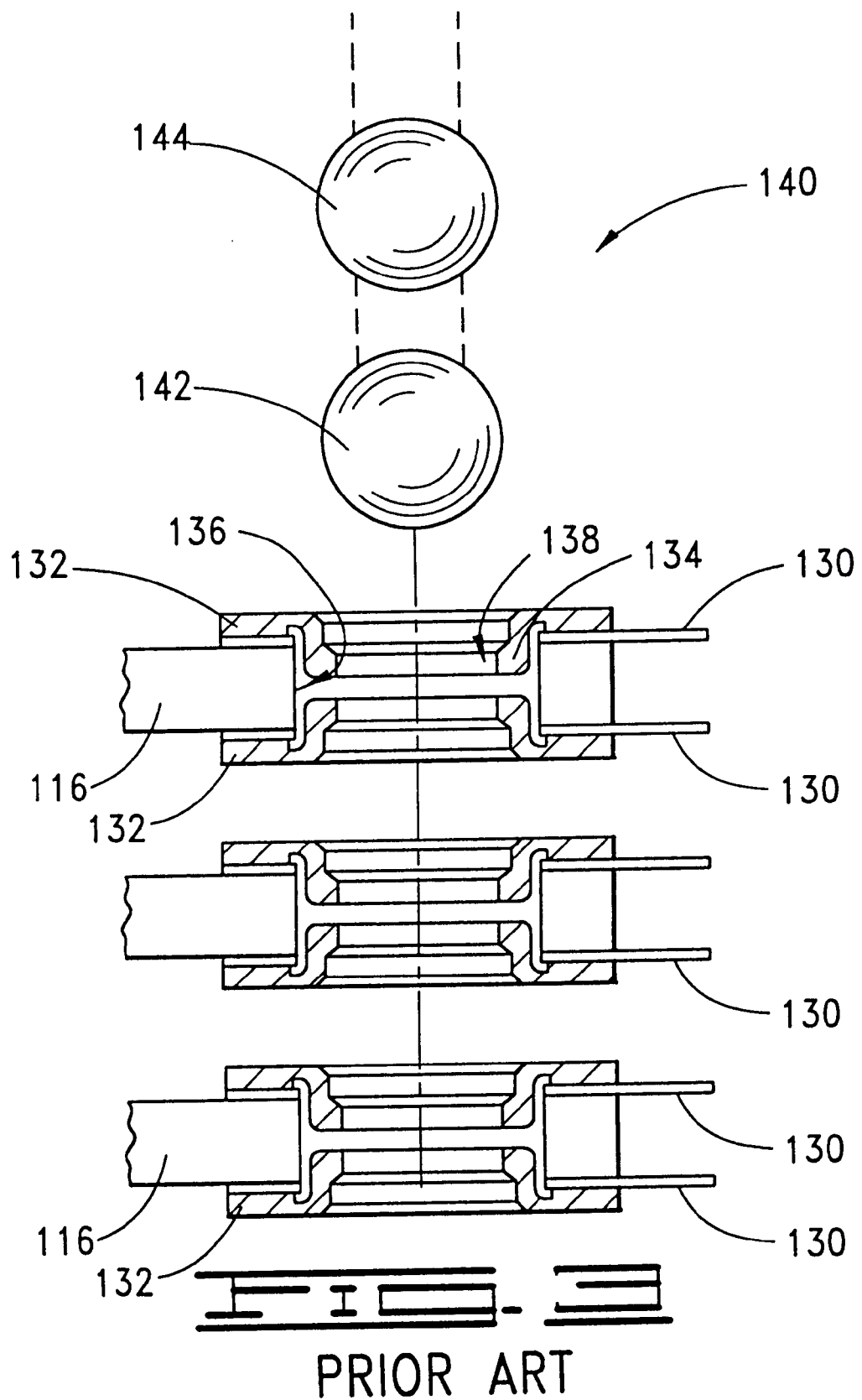
FIG. 3 is a simplified detail sectional elevation view of a typical prior art swage mounting system for head suspension assemblies.

Turning to FIG. 3, shown therein is a sectional elevation view of a typical prior art swage mounting system for head suspensions 114. It will be noted that the head suspension 114 includes a spring member 130 and a relatively robust mounting plate 132 both preferably formed of stainless steel, and that the mounting plate 132 further includes a swage boss 134 which is inserted into a bore 136 formed in the mounting arm 116. FIG. 3 also shows that a pair of mounting plates 132 is associated with each mounting arm 116, with the bosses 134 of an upper mounting plate 132 inserted into the bore 136 from the top-side of the mounting arm 116, and the boss 134 of a lower mounting plate 132 inserted into the bore 136 from a bottom-side of the mounting arm 116. The actuator body 118 and the mounting arms 116 are commonly formed of aluminum or magnesium to minimize the inertial response of the actuator assembly 122.

The swage boss 134 includes a central opening 138. After the bosses 134 have been aligned with the bore 136 and the mounting plates 132 have been positioned adjacent to the mounting arms 116 as shown in FIG. 3, a swaging tool 140 is passed through the central openings 138 in the swage bosses 134. The swaging tool 140 includes a ball member 142 that is slightly larger than the diameter of the central opening 138 thus causing plastic deformation of the swage bosses 134, expanding them into intimate contact with the surface defining the bore 136.

It is also known in the industry to provide a comb-like manufacturing fixture (not shown) with fingers dimensioned to fit between mounting plates 132 to maintain the mounting plates 132 in an intended relationship to the mounting arms 116 prior to the swaging operation. This prevents the force applied by the swaging operation from bending the mounting arms 116 relative to each other and to the central portion of the actuator body 118.

The swaging tool 140 can include a second ball member 144 which has a diameter slightly larger than the diameter of the first ball member 142. With the use of such a "two-ball" swaging tool, the plastic deformation of the swage bosses 134 is accomplished in two stages.

One of the problems associated with this type of swage mounting of the head suspensions 114 can be described in relationship to FIG. 3. It is apparent that when the swaging tool 140 is passed through the aligned swage bosses 134, a stretching force is exerted on the swage bosses 134 inserted into the mounting arms 116 from the top, that is, the force places the swage bosses 134 in tension as the ball members 142, 144, pass therethrough. Those swage bosses 134, however, which have been inserted from the bottom of the mounting arms 116 will be placed in compression. This difference in applied mechanical stresses can lead to corresponding differences in the resultant flatness of the mounting plates 132 after the swaging operation, with attendant differences in the attitudes of upper and lower spring members 130. One of skill in the art will appreciate that those mounting plates 132 on the upper surfaces of the mounting arms 116 will tend to have their peripheral edges lifted away from the mounting arms 116, while those mounting plates 132 on the lower surfaces of the mounting arms 116 will have a tendency to lift away from the mounting arms 116 in the central area adjacent the swage bosses 134. This difference in the final assembled condition of "up" and "down" mounting plates 132 causes, through the spring members 130, undesirable differences in the static roll and pitch attitudes of the head assemblies 112 carried at the distal ends of the head suspensions 114. The elimination of this uncontrolled variation in the load forces applied to the head assemblies 112 is one of the goals of the present invention.

Shape memory alloys are well known in the art, and are typically characterized as having two distinct crystalline states or phases, each of which is achieved at specific temperatures dependent on the exact alloy composition and the fabrication processes used in the manufacture of components. The first of these two phases, the martensitic phase, is characterized as occurring at a lower temperature range than the second, or austenitic, phase. The martensitic phase is also typically "weaker" or more malleable than the austenitic phase. The austenitic phase is sometimes referred to as the "trained" phase. If a shape memory alloy component is formed to a particular shape and heated to a transition temperature (dependent upon alloy composition) while held in that shape, the component forms with a "memory" of that shape. When allowed to cool, the material switches to the martensitic phase, and can be bent or deformed with relative ease. If the component is then heated to an activation temperature (again dependent on alloy composition), the component again transforms to its austenitic phase, and recovers the shape in which it was originally "trained". The transformation phase change of certain shape memory alloys can also be accompanied by a significant and abrupt dimensional change.

Figure 4:
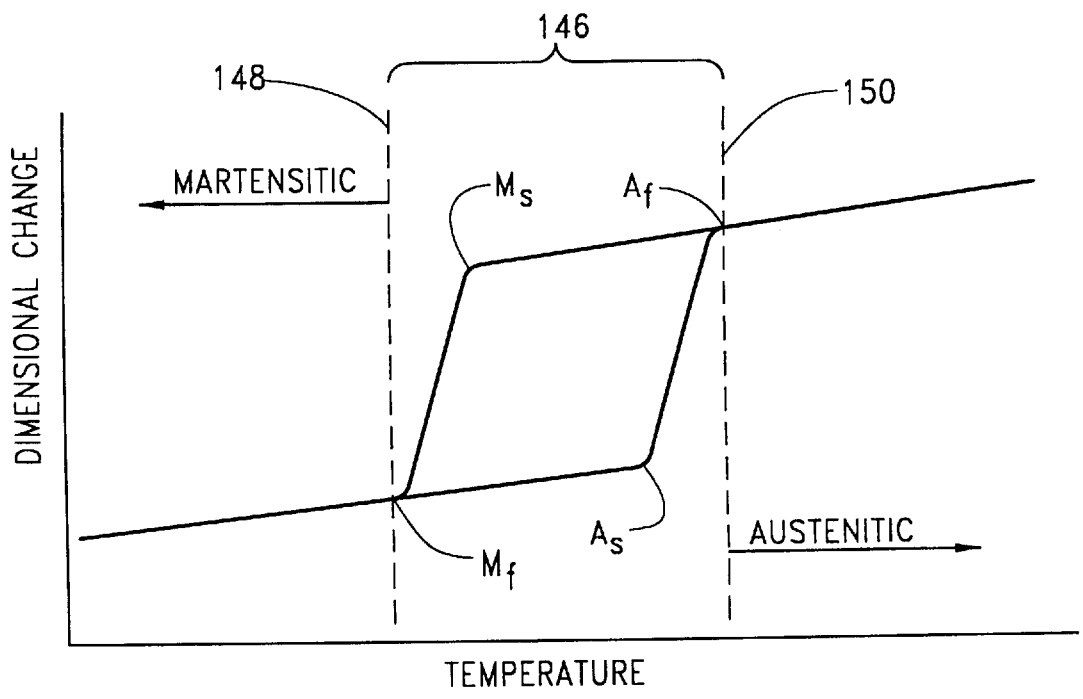
FIG. 4 is a graphic representation of the properties of a typical shape memory alloy.

FIG. 4 is a graphic representation of the relationship between material phase change in a shape memory alloy as a function of temperature change, and shows also the relationship of this phase change to dimensional change. The horizontal axis corresponds to temperature, with lower temperatures toward the left and higher temperatures toward the right, and the vertical axis corresponds to dimensional changes, with increases in dimension being represented in the upward direction, and dimensional decreases in the downward direction. The graphic representation of FIG. 4 is generally applicable to shape memory alloys, and as such is not specifically scaled.

At a point along the horizontal temperature scale, determined by the specific shape memory alloy in question, lies a transition zone 146, delineated by dashed lines 148 and 150. At temperatures less than that defined by dashed line 148, the shape memory alloy is in a martensitic state and at temperatures higher than that defined by dashed line 150 the shape memory alloy is in its austenitic state. A discussion of the effect of temperature changes on the dimensional characteristics of shape memory alloys can now be undertaken.

Assuming that the shape memory alloy is in the martensitic state, i.e., that portion of FIG. 4 to the left of dashed line 148, changes of temperature that do not exceed the lower end of the transition zone 146 will result in comparably small linear changes in the dimensions of a component made with the shape memory alloy. That is, variations in temperature will result in variations in dimension associated with the thermal coefficient of expansion of the material. If, however, the temperature continues to increase, a transformation temperature will eventually be reached whereat a phase change in the shape memory alloy will occur. If, as stated above, the shape memory allow is in the martensitic state, the transformation temperature is the point designated as $A_s$ for "austenitic-start". As can be seen in FIG. 4, once a temperature corresponding to $A_s$ has been reached, a small amount of additional temperature increase will result in a relatively large amount of dimensional change, until a second defining temperature, $A_f$, for "austenitic-finish" is reached. Thus in the narrow temperature range between $A_s$ and $A_f$ the dimensions of the material undergo a relatively large and rapid increase. Further temperature increases above $A_f$ will once again result in relatively small linear dimensional changes associated with the thermal coefficient of expansion.

Conversely, if the shape memory alloy is in its austenitic phase, that is in that portion of the temperature range to the right of dashed line 150, temperature changes produce dimensional changes only to the extent associated with the coefficient of thermal expansion. If, however, the temperature continues to decrease, a point is reached at which the shape memory alloy begins to change phase from austenitic to martensitic, and this "martensitic-start" point is designated as $M_s$ in FIG. 4. Once again, it can be seen that a continuing small decrease in temperature will result in a relatively large and rapid change in dimension, until such time as the temperature reaches a "martensitic-finish" point, $M_f$, at which temperature the dimensional change again returns to a relatively low linear rate in relationship to the thermal coefficient of expansion.

As is known to those of skill in the art, the specific temperatures for $A_s$, $A_f$, $M_s$ and $M_f$ are inherent properties of the specific shape memory alloy, as are the relative amounts of dimensional change inside and outside of the transition zone 146, the relative rapidity of dimensional change between the "start" points and "finish" points of the phase transition, and the relative width of the transition zone 146. While specific shape memory alloys will be discussed in the ensuing discussion, it should be noted that the scope of the present invention is considered to be wide enough to include all shape memory alloys that will perform the function of the invention as described.

Table 1 below defines certain characteristics of some known shape memory alloys, and is taken from "*Shape Directory Alloys*", K. Shimizu and T. Tadaki, Gordon and Breach Science Publishers.

TABLE 1

Alloys which have a shape memory effect

| Alloy Family | Composition % | Transformation Temp Range | |
|---|---|---|---|
| | | $C_m$ | $C_a$ |
| Ag Co | 44–49 Co | −190° C. | −50° C. |
| Au Co | 46.5–50 Co | −100° C. | 50° C. |
| Cu Al Ni | 14 Al, 4.5 Ni | −140° C. | −100° C. |
| Cu Sn | 15 Sn | −120° C. | −30° C. |
| Cu Zn | 38.5–41.5 Zn | −180° C. | −10° C. |
| In Ti | 18–23 Ti | −100° C. | −60° C. |
| Ni Al | 36–38 Al | −180° C. | −100° C. |
| Ni Ti | 4.9–5.1 Ni | −110° C. | −50° C. |
| Fe Pt | 25 Pt | −130° C. | −130° C. |
| Mn Cu | 5–75Cu | −250° C. | −180° C. |
| Fe Mn Sl | 32 Mn, 6 Sl | −200° C. | −150° C. |

One particular shape memory alloy that has been used to test the feasibility and functionality of the present invention is called "Alloy X", a product of Memry Corporation, Brookfield, Conn., which provided the material characteristics of Alloy X, noted in Table 2, below.

TABLE 2

Properties of Alloy "X"

| A. | Composition: | 36–39% Ti |
| | | 45–51% Ni |
| | | 13–15% Nb |
| B. | Recovery Strain: | 2.5% |
| C. | Transformation Temperatures | |
| | Austenitic Final ($A_f$) = | 100° C. |
| | Martensitic Start ($M_s$) = | −80° C. |
| D. | Pretraining Temperature = | −80° C. |
| | (temperature at cold work) | |

The manner in which Alloy X was used to implement the head suspension mounting system of the present invention will now be described.

Figure 5:
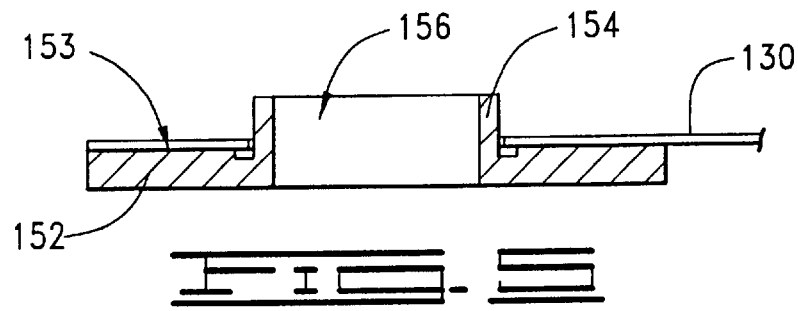
FIG. 5 is a simplified sectional elevation view of a mounting plate which forms a part of the present invention.

Turning to FIG. 5, shown therein is a simplified sectional elevation view of a novel mounting plate 152 which forms a part of the present invention. As shown, the mounting plate 152 has a planar surface 153. The mounting plate 152 has a cylindrically shaped mounting boss 154 that depends from the mounting plate planar surface 153 to provide a first locking feature for a purpose described below. The spring 130 preferably has an aperture that slips over the mounting boss 154, and the spring 130 is attached to the mounting plate 152, such as by spot welding. A comparison between the mounting plate 152 and the prior art mounting plate 132 of FIG. 3 reveals that the mounting boss 154 forms a simple cylinder, while the prior art mounting plate 132 has a swage boss 134 with various beveled step features to facilitate the passage of the swage tool 140. The mounting boss 154 in comparison has a relatively thin wall and a comparably larger central opening 156.

Figure 6:
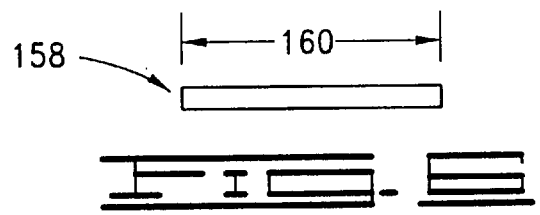
FIG. 6 is an elevation view of a shape memory alloy disc which forms a part of the present invention.

FIG. 6 shows a mounting disc 158 which is the other principal component of the head suspension of the present invention. The mounting disc 158 is fabricated from a shape memory alloy which expands at a temperature above its characteristic transformation temperature, undergoing a relatively large and abrupt dimensional increase at the transformation from the martensitic phase to the austenitic phase, as discussed above. Specifically, the invention contemplates that the mounting disc 158 will be cold worked in the martensitic phase at ambient temperature, using methods well known for shape memory alloy, to a diameter 160 in the martensitic phase which is substantially the same as the diameter of the central opening 156 of the mounting plate 152. During prototype testing, for instance, a mounting plate 152 was made with its central opening 156 having a diameter of 0.0974 inches, and the mounting boss 154 with an outside diameter of 0.1075 inches, thus having a wall thickness of 0.00505 inches. The mounting disc 158 was fabricated with a diameter in the martensitic phase of 0.0975 inches and a thickness of 0.0100 inches. Thus, the mounting disc 158 was capable of being lightly press-fitted into the central opening 156 of the mounting boss 154 when the material of the mounting disc 158 was in the martensitic phase. This assembly condition is illustrated in FIG. 7.

Figure 7:
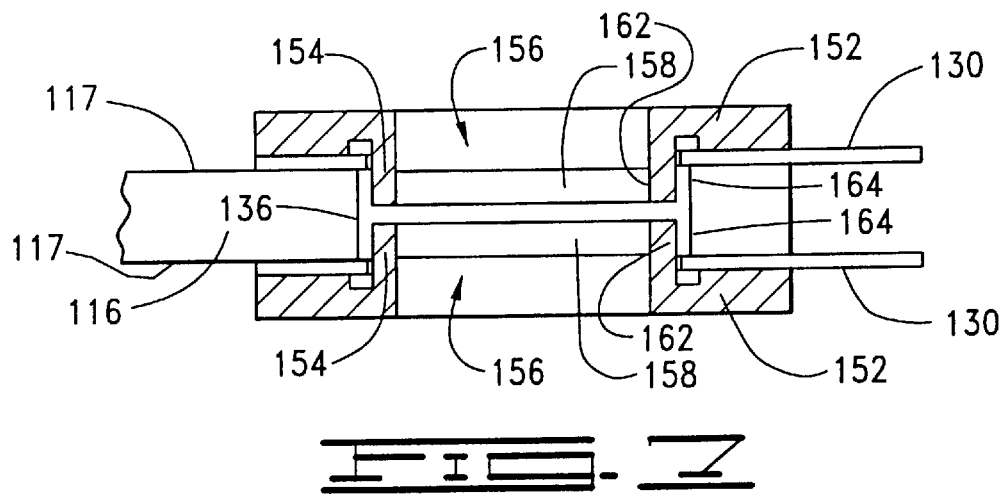
FIG. 7 is a simplified detail sectional elevation view of the mounting system of the present invention at an intermediate stage of the assembly process.

FIG. 7 is a simplified sectional elevation view of the head suspension mounting system of the present invention at an intermediate stage of a preferred assembly process. There it can be seen that a pair of mounting plates 152 with springs 130 have been positioned adjacent the upper and lower surfaces of the mounting arm 116, with the mounting bosses 154 extending into the bore 136 formed in the mounting arm 116. Each of the mounting plates 152 has a mounting disc 158 inserted within its central opening 156. The material of the mounting discs 158 is in the martensitic phase at the time of insertion in the mounting boss 154.

Each mounting arm 116 has top and bottom planar surfaces 117, and the bore 136 is orthogonal to, and intersects, the top and bottom planar surfaces 117. The arcuate surface of the mounting arm 116 that forms the bore 136 serves as a second locking feature that cooperates with the aforementioned locking feature of the mounting plate 152.

A discernible gap exists between the outer diameter of the mounting bosses 154 and the inner diameter of the bore 136. In practice, it is contemplated that the outer diameter of the mounting bosses 154 and the inner diameter of the bore 136 will be selected such that these elements are closely fitting to facilitate the alignment of the head suspension assemblies 114 and the mounting arms 116. A comb-like manufacturing fixture (not shown), similar to that described above, may be used to maintain the mounting plates 152 in the position shown in FIG. 7.

Figure 8:
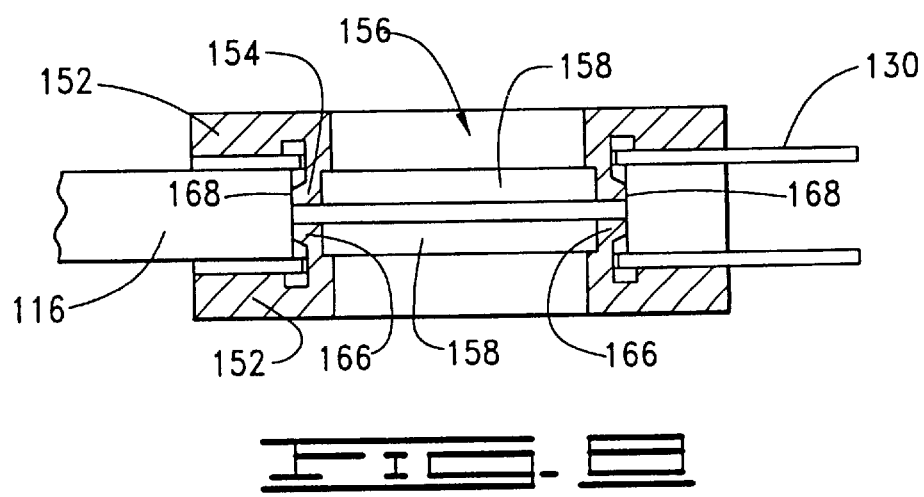
FIG. 8 is a simplified detail sectional elevation view of the mounting system of the present invention in its final assembled condition.

FIG. 8 shows the head suspension mounting system of the present invention in a final assembled condition. In FIG. 8, the mounting discs 158 have been heated, such as by using hot air, at least to the transformation temperature. The phase change in the material of the mounting discs 158 results in a relatively large dimensional increase which causes the walls of the mounting bosses 154 to be cold-flowed and expanded outwardly into intimate contact with the inner diameter of the bore 136 in the mounting arm 116, as shown in FIG. 8. That is, for each mounting plate 152, the mounting boss 154 (the first locking feature) and the arcuate surface in the bore 136 (the second locking feature) are forcibly brought together to interlock as depicted in FIG. 8, thereby securing the mounting plate 152 to the mounting arm 116.

Experimentation with mounting discs 158 formed of Alloy X have shown that the martensitic-to-austenitic phase change results in a dimensional increase of 2.0 to 3.0%. For instance, a mounting disc 158 having a diameter of 0.0975 inches in its martensitic phase was found to grow to have a diameter of 0.0998 inches after undergoing the phase change from martensitic to austenitic, or an increase in diameter of 0.0023 inches or approximately 2.4%. Since, as noted above in Table 2, the phase transformation and dimensional change will occur with a constrained elastic force of approximately 65,000 psi, it is apparent that the increase in the diameter of the mounting discs 158 can be expected to provide sufficient force and displacement to expand the mounting bosses 154 into such intimate contact with the actuator body 118 within the bore 136 as to ensure adequate mounting of the head suspension assemblies 114.

While the embodiment of the invention described above includes a shape memory alloy component in the form of a mounting disc 158, other component geometries, such as rings or rods, are contemplated to fall within the scope of the present invention.

One skilled in the art will recognize the significant advantage provided by the head suspension mounting system of the present invention in that a simplified manufacturing process is thereby provided. In conventional mechanical ball swaging, the actuator arms 116 must be individually supported to prevent plastic deformation of the planar surfaces as a result of the orthogonal force imparted by the passing swaging ball. Typically, the actuator arms 116 are blocked, that is, a spacer is placed between adjacent actuator arms to fill the gap therebetween. The entire actuator body 118 is then mechanically clamped with the spacers in place to provide support to the planar surfaces of each of the thin actuator arms 116. It will be noted the method and apparatus of the present invention does not require lending support to the planar surfaces of the actuator arms in order to perform the swaging process.

It will be noted that elimination of the need for lateral support of the actuator arms 116 during swaging provides the opportunity for improved quality of the final assembly, or finally swaged actuator assembly. The planar surface of each actuator arm 116 establishes the datum point for locating the associated head suspension 114. The attachment method of the present invention provides an improved assembly by eliminating the pressing engagement of the datum surface against the head suspension 114. The resulting free state of the actuator arm 116 provides an independently established planar datum point for each associated head suspension, without influence of adjacent planar surfaces imparted by the clamping necessary in the prior art method.

From the foregoing, it is apparent that the present invention is particularly well suited and well adapted to achieve the objects and advantages described hereinabove, as well as possessing other advantages inherent therein. While a particular combination of components and materials have been disclosed with regard to the presently preferred embodiment, certain variations and modifications may be suggested to one of skill in the art upon reading this disclosure. Therefore, the scope of the present invention should be considered to be limited only by the following claims.

What is claimed is:

1. An actuator assembly for use in a disc drive to support a head adjacent a rotatable disc, the actuator assembly comprising:

an actuator arm having a planar surface through which a bore normally extends, the bore having a bore interior surface;

a suspension assembly which supports the head and which comprises a plate from which a boss normally extends, the boss having a boss central opening and a boss exterior surface, the boss extending into the bore; and a locking member disposed within the boss central opening and comprising a shape memory material having martensitic and austenitic phase conditions, wherein when the locking member is in the martensitic phase condition the boss loosely fits within the bore so that a gap exists between the boss exterior surface and the bore interior surface, and wherein when the locking member transitions to the austenitic phase condition the locking member expands to selectively deform the boss so that a first locking feature comprising a portion of the boss exterior surface contactingly engages a second locking feature comprising a corresponding portion of the bore interior surface and the gap is maintained between respective remaining portions of the boss exterior surface and the bore interior surface.

2. The actuator assembly of claim 1, wherein the boss has a total boss length as measured in a direction from the plate, wherein the locking member comprises a circular disc having a disc diameter and a disc thickness, and wherein the disc thickness is less than the total boss length so that the disc deforms a length of the boss less than the total boss length to reduce strain in remaining portions of the suspension assembly.

3. The actuator assembly of claim 1, wherein the actuator assembly is formed by a process comprising steps of:

(a) inserting the locking member into the bore central opening with the locking member in the martensitic phase condition;

(b) aligning the plate of the suspension assembly with the planar surface of the actuator arm so that the boss extends into the bore; and (c) transforming the locking member from the martensitic phase condition to the austinitic phase condition to interlock the respective first and second locking features.

4. The actuator assembly of claim 3, wherein the transforming step (c) comprises a step of heating the locking member to transition the locking member from the martensitic phase condition to the austinitic phase condition.

5. The actuator assembly of claim 1, wherein the planar surface of the actuator arm is characterized as a first planar surface and the actuator arm comprises a second planar surface opposite the first planar surface so that the bore extends from the first planar surface to the second planar surface, wherein the head, suspension assembly, plate, boss, boss central opening, boss exterior surface and locking member are respectively characterized as a first head, a first suspension assembly, a first plate, a first boss, a first boss central opening, a first boss exterior surface and first locking member, and wherein the actuator assembly further comprises:

a second suspension assembly which supports a second head and which comprises a second plate from which a second boss normally extends, the second boss having a second boss central opening and a second boss exterior surface, wherein the first and second plates are aligned so that the first and second bosses extend into opposing ends of the bore; and a second locking member disposed within the second boss central opening and comprising a shape memory material having martensitic and austenitic phase conditions, wherein when the second locking member is in the martensitic phase condition the second boss loosely fits within the bore so that a second gap exists between the second boss exterior surface and the bore interior surface, and wherein when the locking member transitions to the austenitic phase condition the second locking member expands to selectively deform the second boss so that a third locking feature comprising a portion of the second boss exterior surface contactingly engages a fourth locking feature comprising a corresponding portion of the bore interior surface and the second gap is maintained between respective remaining portions of the second boss exterior surface and the bore interior surface.

6. An actuator assembly for use in a disc drive, the actuator assembly comprising an actuator arm having a planar surface through which a bore normally extends and a suspension assembly supporting a head adjacent a rotatable disc and having a plate from which a boss normally extends, the bore having a bore interior surface and the boss having a boss central opening and a boss exterior surface, wherein the suspension assembly is rigidly affixed to the actuator arm by a process comprising steps of:

(a) providing a locking member comprising a shape memory material having martensitic and austenitic phase conditions;

(b) inserting the locking member into the bore central opening with the locking member in the martensitic phase condition;

(c) aligning the plate of the suspension assembly with the planar surface of the actuator arm so that the boss extends into the bore; and (d) transforming the locking member from the martensitic phase condition to the austinitic phase condition to interlock the suspension assembly and the actuator arm, wherein when the locking member is in the martensitic phase condition the boss loosely fits within the bore so that a gap exists between the boss exterior surface and the bore interior surface, and wherein when the locking member transitions to the austenitic phase condition the locking member expands to selectively deform the boss so that a first locking feature comprising a portion of the boss exterior surface contactingly engages a second locking feature comprising a corresponding portion of the bore interior surface and the gap is maintained between respective remaining portions of the boss exterior surface and the bore interior surface.

7. The actuator assembly of claim 6, wherein the boss has a total boss length as measured in a direction from the plate, wherein the locking member comprises a circular disc having a disc diameter and a disc thickness, and wherein the disc thickness is less than the total boss length so that the disc deforms a length of the boss less than the total boss length to reduce strain in remaining portions of the suspension assembly.

8. The actuator assembly of claim 6, wherein the transforming step (c) comprises a step of heating the locking member to transition the locking member from the martinsetic phase condition to the austinitic phase condition.

* * * * *